May 15, 1934.    D. KELLEHER ET AL    1,959,028
APPARATUS FOR AND METHOD OF MAKING VALVE SPRING RETAINER LOCKS
Filed June 20, 1932    3 Sheets-Sheet 1
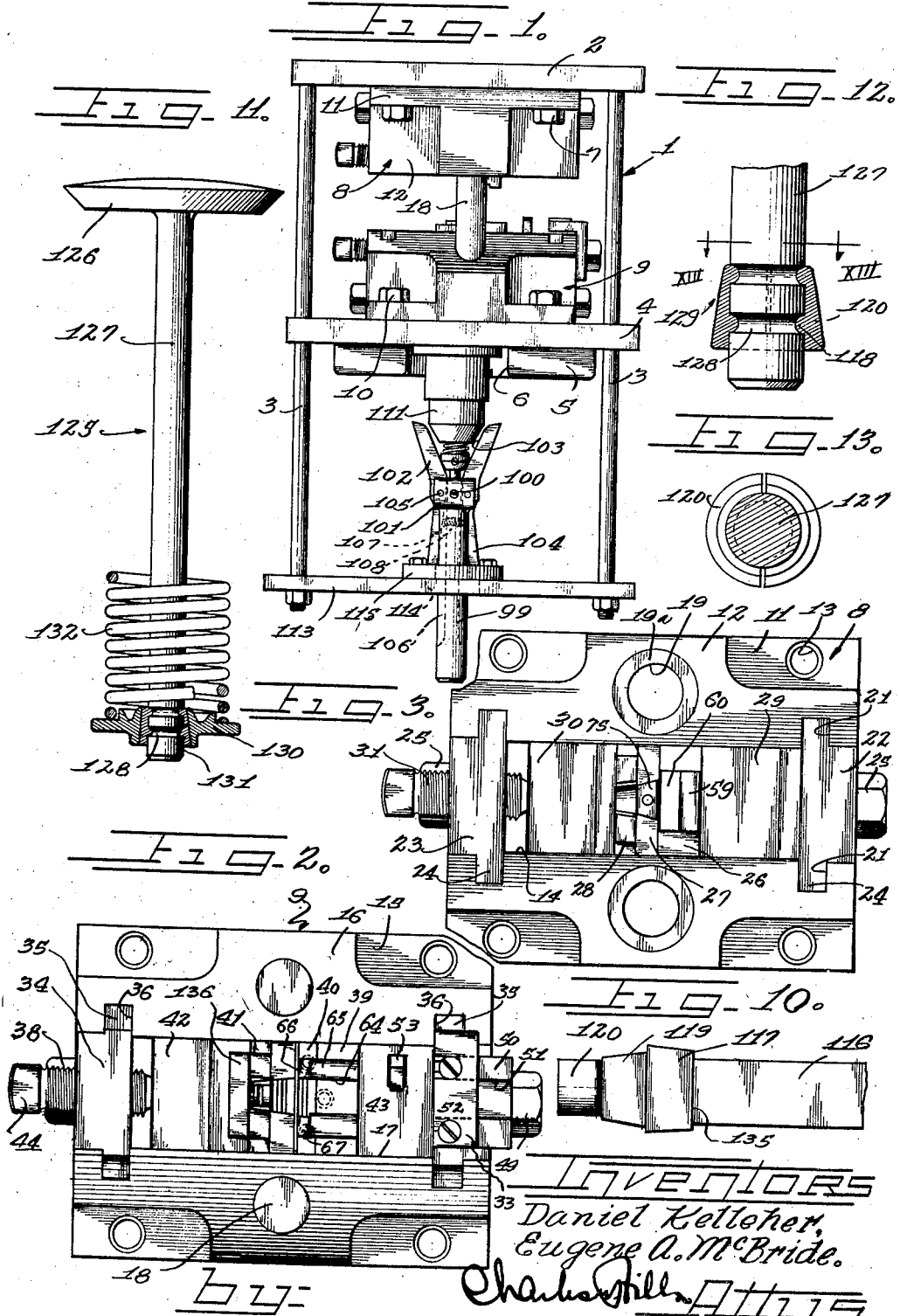

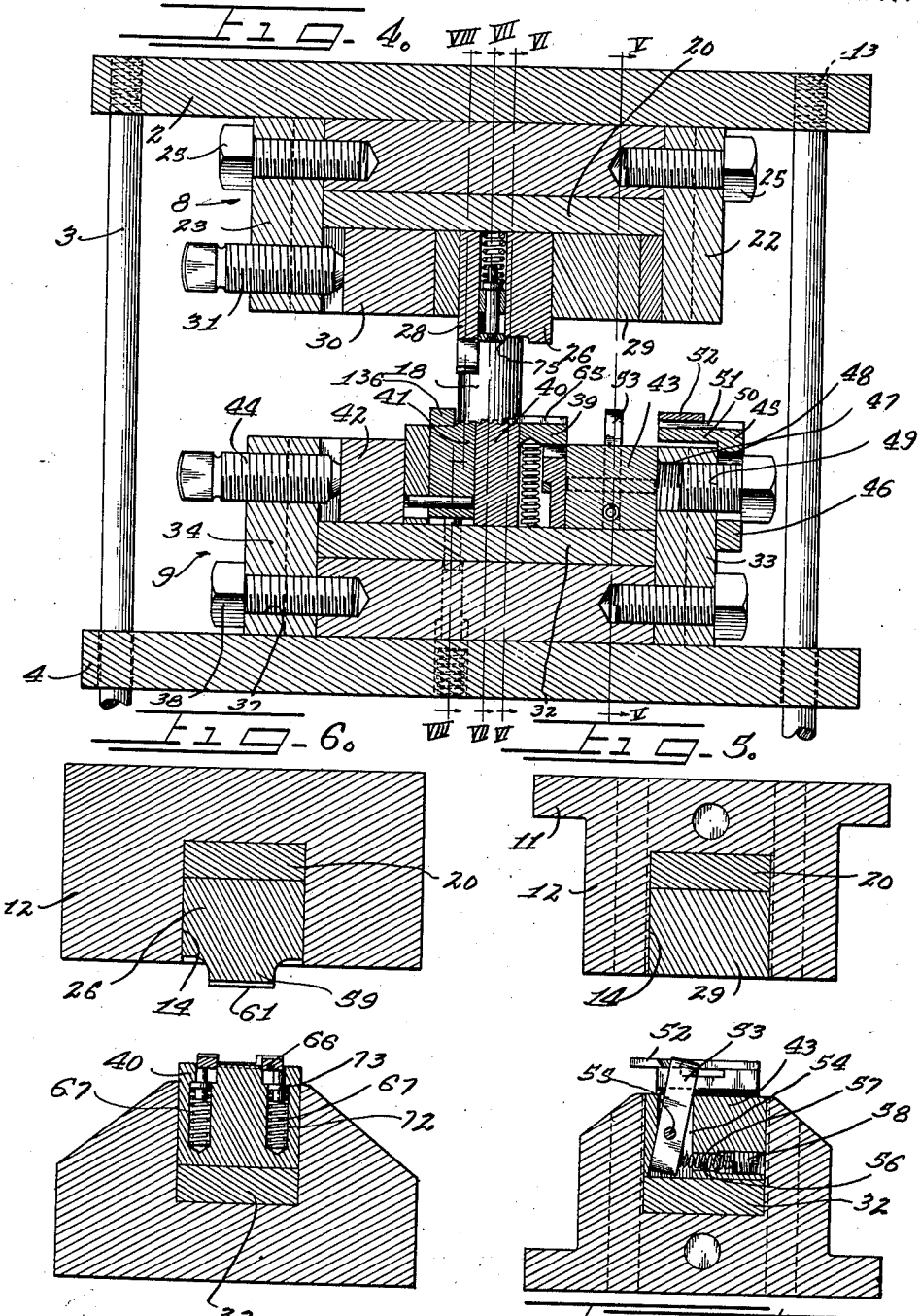

May 15, 1934.  D. KELLEHER ET AL  1,959,028
APPARATUS FOR AND METHOD OF MAKING VALVE SPRING RETAINER LOCKS
Filed June 20, 1932   3 Sheets-Sheet 3
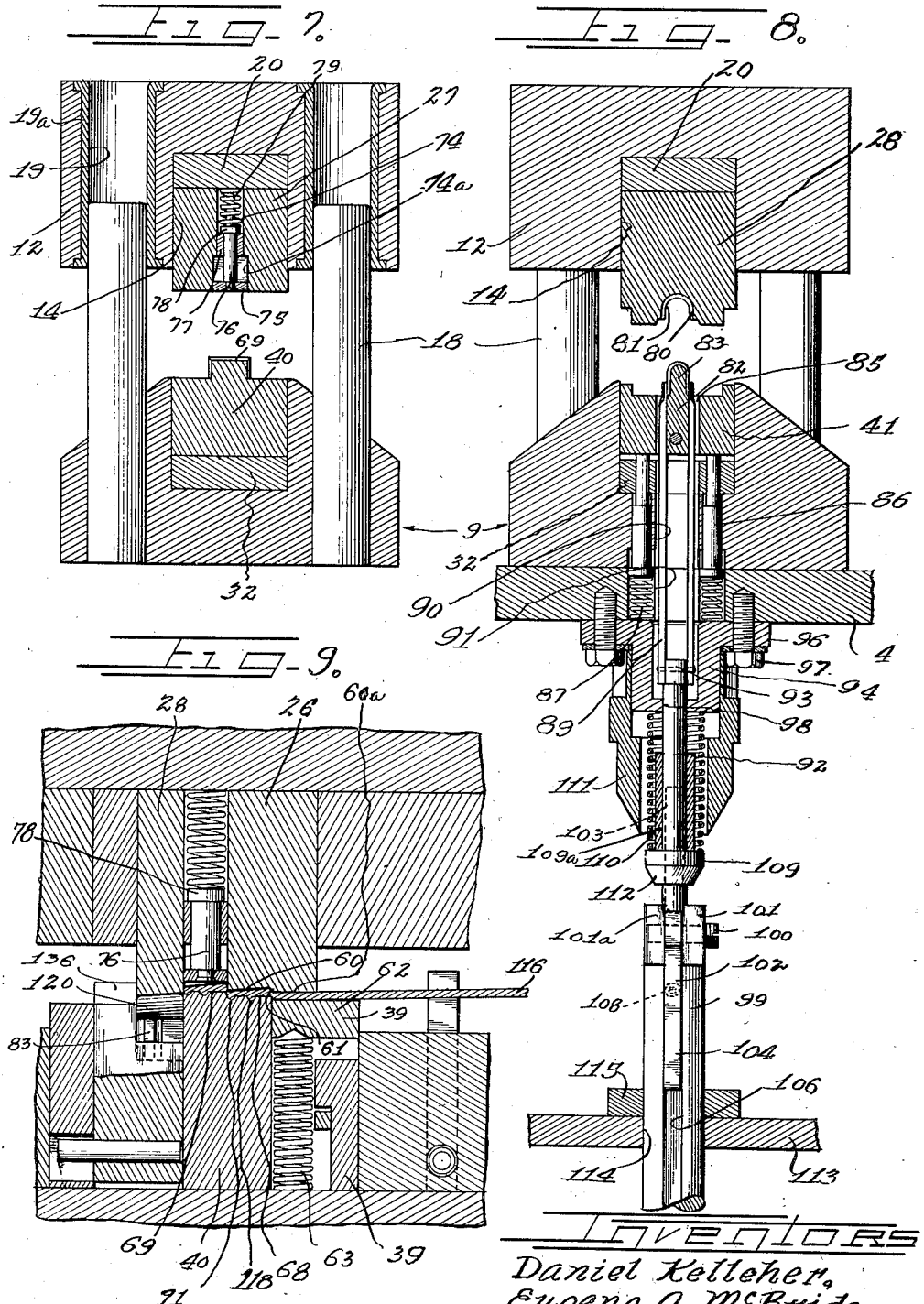
Inventors
Daniel Kelleher,
Eugene A. McBride.

Patented May 15, 1934

1,959,028

UNITED STATES PATENT OFFICE 1,959,028

APPARATUS FOR AND METHOD OF MAKING VALVE SPRING RETAINER LOCKS

Daniel Kelleher and Eugene A. McBride, Cleveland, Ohio, assignors to Thompson Products, Incorporated, Cleveland, Ohio, a corporation of Ohio Application June 20, 1932, Serial No. 618,232

13 Claims. (Cl. 29—33)

This invention relates to an apparatus for and a method of making metal collars, and particularly to an apparatus for and a method of making spring retaining locks for poppet valves of automotive engines.

Valve spring retainer locks, formed of two parts, each of substantially semi-cylindrical shape, with one or more internal beads for fitting corresponding grooves in the valve stem, have been used in automobiles. One way of making these collars is to form them from cylindrical stock and saw each collar into two parts. Because of the small size of the collars, the operation of forming the internal beads is necessarily expensive. The sawing operation is also expensive and it is also oftentimes necessary to smooth the pieces by hand-filing. Such collars are also made from bar stock in an automatic screw machine, but this method is also expensive. Consequently, retainer locks of an approved type have been used only in fairly expensive installations, various other expedients being resorted to in order to provide spring retainer means in the less expensive installations.

It is, therefore, the purpose of this invention to provide an apparatus for and method of making valve spring retainer locks by which a lock of a type suitable for the most exacting purposes can be produced at a relatively small cost.

To this end, we have devised an apparatus for forming the retainer locks by successive stamping operations on metal strips.

It is an object of this invention to provide an apparatus which will successively flatten, emboss, curl and shear a metal strip to produce half collars of small size for use as spring retainer locks.

It is a further object of this invention to provide an apparatus for forming successive portions of a metal strip into semi collars for use as spring retainer locks.

It is a still further object of this invention to provide an apparatus into which a strip of metal is fed and which forms and ejects portions of the strip as locks for spring retainers.

It is a particular object of this invention to provide an apparatus for forming spring retainer locks which may be used with a common punch press.

It is a further particular object of this invention to provide an apparatus of this type wherein only sufficient metal is passed into the forming die to form a half block member, thereby cutting costs due to wasting of material.

It is a still further particular object of this invention to provide an apparatus for forming spring retainer locks which is simple, positive and economical in operation.

Other and further important objects of this invention will be apparent from the disclosures in the specification and the accompanying drawings.

This invention, in a preferred form, is illustrated in the accompanying drawings and hereinafter more fully described.

On the drawings:

Figure 1 is a side elevational view of apparatus embodying our invention.

Figure 2 is a plan view of the lower die block.

Figure 3 is a bottom plan view of the upper die block.

Figure 4 is an enlarged longitudinal vertical cross-sectional view of the upper and lower die blocks and associated frame parts.

Figure 5 is a sectional view taken substantially on the plane of the line V—V of Figure 4.

Figure 6 is a sectional view taken substantially on the plane of line VI—VI of Figure 4.

Figure 7 is a sectional view taken substantially on the plane of the line VII—VII of Figure 4.

Figure 8 is a sectional view taken substantially on the plane of the line VIII—VIII of Figure 4 and also showing the understructure partly in section and partly in elevation.

Figure 9 is an enlarged fragmentary sectional view similar to Figure 4 but showing the die blocks in opposed position with a strip of material therebetween.

Figure 10 is a plan view of a strip of material used for forming the lock showing the stamping operations performed thereon.

Figure 11 is an elevational view, partly in vertical section, of a valve carrying a valve stem collar as produced by the present method and showing a valve spring and spring retainer assembled thereon.

Figure 12 is a fragmentary elevational view of the valve stem showing a retainer lock thereon in vertical section.

Figure 13 is a sectional view taken substantially on the plane of line XIII—XIII of Figure 12.

As shown on the drawings:

The lock forming apparatus of our invention, which is designated, as a whole, by the reference numeral 1, is particularly adapted to be used with a punch press (not shown) of any standard type. The apparatus 1 comprises a movable plate 2, against which the ram of the press abuts. A number of rod members or legs 3 are attached to said plate 2 and depend therefrom to serve as guides. A second plate 4 is slidably mounted on the legs 3 and is adapted to rest on the anvil piece 5 of the punch press. As shown in Figure 1, the anvil 5 is recessed, as at 6, to receive a part of the apparatus later to be described.

Depending from the plate 2 and attached thereto by bolts 7 is a die block 8. A corresponding die block 9 is provided on the upper face of the plate 4, it being attached thereto by bolts 10.

The block 8 comprises a plate 11 and an integral cross-shaped depending portion 12. The plate 11 has a number of apertures 13 for receiving the retaining bolts 7. The portion 12 is provided with a recess 14 extending the full length thereof for receiving a number of dies and adjusting members as will later be described.

Block 9 is formed of a plate 15 having a cross-shaped portion 16 integral therewith and extending upwardly therefrom and provided with a recess 17 longitudinally thereof which corresponds with the recess 14 in the upper block 8. The block 9 is provided with a pair of rods 18 fixed thereto, a rod 18 preferably extending upwardly from each arm of the cross-shaped portion 16. Recesses 19, having bushings 19a (Fig. 7) are formed in the cross arms of the portion 12 of block 8 for receiving the rods 18. The combination of rods 18 and recesses 19 serves to align the die blocks 8 and 9.

The apparatus is adapted to perform three stamping operations on a strip of metal and, for convenience, these operations will be designated as A, B and C, respectively.

The operations are performed in succession on a strip which is passed therethru. A series of dies in blocks 8 and 9 serve to shape the strip and the dies are so arranged, as will later be described, that they will perform operations on adjacent portions of the strip simultaneously.

As shown in Figure 4, a plate 20 is fitted into the recess 14 of block 8. The plate 20 is shorter than the recess 14 and, when in place, terminates adjacent the edges of vertical recesses 21 (Fig. 3) formed in opposite pairs adjacent the ends of the side walls defining the recess 14.

End pieces 22 and 23, of substantially the same depth as the recess 14, are fitted into the recess 14 against the ends of the plate 20. Each end piece is provided with laterally extending flanges 24 on each side thereof which are snugly received in the recesses 21. As a further securing means for the end plates 22 and 23, bolts 25 extend therethrough near the bases thereof and are threaded into the portion of the block 8 underlying the plate 20.

Dies 26, 27 and 28 (Figs. 3 and 4) are fitted into the recess 14 at the middle thereof and are held in place by spacers 29 and 30 located on each side thereof and between the dies and the removable end pieces 22 and 23. As illustrated, the end wall 23 may be provided with a set screw 31 adapted to be threaded against the adjacent spacer 30 for adjusting the die pieces and holding them firmly in place.

The lower block 9 is similarly provided with a plate 32, removable end walls 33 and 34 having flanges 35 fitting in vertical grooves 36 formed in opposite pairs adjacent the ends of the walls of the longitudinal recess 17. Also, as an additional securing means, the removable end walls 33 and 34 are provided (Fig. 4) with apertures 37 through which bolts 38 are fitted, which bolts are threaded into the portion of the block 9 lying below the plate 32.

Dies 39, 40 and 41 are fitted into the recess 17 at the middle portion thereof and are held in place by spacers 42, 43 on each side thereof. Likewise, the end wall 34 has a set screw 44 threaded therethrough and abutting against the adjacent spacer 42.

The end wall 33 is provided with an L-shaped guiding piece 45 having a downwardly extending leg 46 and a horizontal leg 50. The leg 46 is provided with an elongated aperture 47 which is aligned with an aperture 48 in the wall 33 and through which apertures a screw 49 is threaded for adjustably holding the guide piece in place. The horizontal leg 50 of the guide piece is provided with a longitudinal recess 51 having an overhanging cover 52 which serves to guide a strip of metal 116 toward the dies.

The spacer 43, adjacent the guide piece 45, is provided with a lever 53 extending upwardly from a recess 54 therein. As shown in Figure 5, the lever 53 is pivoted to the spacer as at 55. A spring 56, fitted in a recess 57 and seated against a set screw 58, acts against the lower end of the lever 53 to urge the upper portion of the lever 53 toward the center line of the groove 51 in member 45. The purpose of the lever 53 is to aid in guiding the metal strip 116 toward the dies.

The dies 26, 39 and 40 cooperate to perform the stamping operation A. The die 26 (Figs. 6 and 9) has a projecting head portion 59, which, in turn, has an offset face portion providing the stamping surfaces 60 and 60a with the shoulder 61 therebetween.

The die 39 is formed with a floating head 62 mounted on a spring 63 positioned in the body portion of the die. The head 62 has a groove 64 on its upper face defined by walls 65 (Fig. 2). These walls 65 extend beyond the die 39 and have offset lowered shoulders 66 which are mounted on springs 67 located in recesses in the die block 40 (Fig. 6).

The die 26 extends over the die 40 as well as die 39, the contacting edges of dies 39 and 40 being located opposite the shoulder 61 of die 26. The die 40 has an offset face (Fig. 9) providing stamping surfaces 68 and 69. The stamping surface 68 underlies the surface 60 in block 26 and the surface 69 is located opposite the face of die 27 with which it cooperates to perform operation B. Each of the surfaces 68 and 69 are provided with a pair of shallow substantially semi-cylindrical grooves or intaglios 71 extending thereacross.

As previously described, the block 40 (Fig. 6) is provided with a pair of springs 67 on which the shoulders 66 rest. These springs 67 are encased in cylindrical recesses 72 in block 40 adjacent member 39. The shoulders 66 rest on seat members 73 about which the upper ends of the springs 67 are coiled. The springs 67 are compressed on the downstroke of the ram. When the pressure is removed, the springs are released and urge the shoulders 66 upward to help strip the metal from the die 40 so that it may be easily moved forward to the adjacent die. The face 69 (Fig. 7) of the die 40 is not coextensive with the width of the block but extends upwardly from the middle portion thereof and cooperates with the upper die 27 in a manner presently to be described.

The die 27 (Fig. 7) is provided with a cylindrical recess 74 which is counterbored, as at 74a. The counterbore 74a is preferably trapezoidal in cross-section and receives a plunger 75 of similar shape having a stem 76 attached thereto. The stem 76 fits through a sleeve 77 in the recess 73 and has an integral collar or end piece 78 for preventing its displacement. A spring 79, in the recess 74, serves to allow the piece 75 resisted movement as the die 27 is brought down on the die 40, causing the faces 75 and 69 to press against opposite sides of the metal strip 116. This abutment of faces 69 and 75 causes the latter to recede and consequently the sides of the metal strip 116 are sheared by the coaction of the edges of face 69 of die 40 and the die 27. This operation, B, serves to prepare the metal strip for the subsequent forming operation C.

The final operation C on the strip of metal is performed by the dies 28 and 41. The upper die 28 (Fig. 8) is provided with a depending head 80 which has a substantially frusto-conical recess 81 therein. The head 80 serves, with the convex semi-cylindrical face 83 of the portion 82 of die 41, to shape the metal strip to final form.

The die 41 is normally spaced a slight distance above the plate, and rests on plungers 86 which extend thru the plate and block and rest on springs 87 located in suitable recesses in the plate 4. The die 41 thus gives slightly when impacted by the die 28 and this action causes the shearing of the metal strip at the edge of the die 40.

The die 41 is provided with a pair of apertures 85, one on each side of the portion 82, through which a pair of ejectors 89 extend. The ejectors 89 extend down through apertures 90 and 91 provided therefor in the die block 9 and base 4, respectively, and are attached to a rod 92 by a pin 93. A cylindrical cap portion 94, having flanges 96 through which bolts 97 extend for securing the cap to base 4, covers the lower portion of the ejectors 89. The cap 94 is closed at one end except for an aperture 98 through which the rod 92 extends.

The rod 92 is attached at its end to a plunger rod 99 by a bolt 100. The plunger 99 has an enlarged head 101 with parallel ears 101ª extending in pairs from each side thereof. Levers 102, each having an upper cam surfaced arm 103 and a lower arm 104, are pivoted to the ears 101ª by the pivot pins 105, as will be clearly seen by reference to Figure 1. The plunger rod 99 is provided with a pair of longitudinal recesses 106 into which the arms 104 of the levers 102 may be swung. The plunger 99 is also provided with a horizontal cylindrical aperture 107 in which a compression spring 108 is located for urging the arms 104 apart to thereby keep them out of the recesses 106.

A collar 109 is slidably mounted on the rod 92 and a spring 110 is compressed between the collar 109 and the bottom of the cap 94. A bushing 109ª serves to limit the extent of the compression of the spring 110. A second housing 111, attached to the base 4 by means of the bolts 97, may be used to cover the whole assembly down to the collar 109. The collar 109 is provided with a lower cam face 112 which rides upon the cam surfaces of the arms 103 of the levers 102, thus tending by force of the spring 110 to spread apart the arms 103 to cause arms 104 to fit in recesses 106.

The ejecting means is operated by a plate 113 (Figs. 1 and 8) securely attached to the lower end of the legs 3 to move therewith. The plate 113 is provided with an aperture 114 having a collar 115 thereabout. The aperture 114 is of sufficient diameter to pass the plunger 99 when the lever arms 104 are in the recesses 106. However, when the arms 104 are in spread out relation, their ends abut against the collar 115 to prevent passage of the plunger 99 through the aperture 114, thereby raising the ejectors 89 as the ram and plate 113 are raised, as will presently be described.

In the operation of the apparatus, a strip of metal 116 is fed therein through the groove 51 in the guide piece 45 and past the aligning lever 53 to the successive sets of dies. The operation performed by the dies 26 and 40 is illustrated in Figures 9 and 10. These dies flatten the metal and spread it as indicated at 117 in Figure 10, at the same time forming the ridges 118 therein by means of the grooves 68 in the die block 40. In this operation, the offset face 60 of the die 26 serves to lower the resiliently mounted die 39 below the die 40, thereby slightly shearing or offsetting the portion 117 from the rest of the strip 116, as at 135.

At the upstroke of the ram, the strip 116 is moved forwardly sufficiently to permit the formed portion 117 thereof to rest on the surface 69 of the die 40, the movable shoulders 66 helping to strip the metal from the face of the die. The upper dies are again brought to bear on the strip and the portion 117 is again shaped to form portion 119. In this action, the resiliently mounted plunger 75 of the die 27 gives upon impact against the face 69 of the die 40, so that the sides of portion 119 are sheared by the coaction of the edges of said cooperating die faces.

The ram is again raised and the strip 116 is again moved forward against the abutment 136 until portion 119 thereof rests on the face 83 of the die 41. The ram is then operated to bring the upper die against the strip to perform the final operation. In this operation, the concave head 80 of die 28 and convex head 83 of the die 41 form the portion 119 into a semi-frustum of a cone, as illustrated at 120 (Figs. 9 and 10). The lower die 41, being resiliently mounted as previously described, gives slightly under the impact of the die 28 and thus serves to shear the portion 120 from the remainder of the strip at the edge of the die 40. The faces of the dies 40 and 41 are provided with grooves properly spaced to maintain the ridges 118 formed in the lower face of the strip.

It will be understood, of course, that, as the strip is being fed through the machine, the three stamping operations will be performed simultaneously on successive portions of the strip.

The form 120 is ejected from the apparatus on the upstroke of the ram in the following manner:

On the downstroke of the ram, the plate 113 is carried past the lower end of the arms 104 on levers 102. Said arms thereupon spring outwardly and are caught against the abutment collar 115 and carried upwardly with the plate 113 as the ram is moved upwardly. This upward movement is transmitted to the rod 92 and ejectors 89, which are rigidly attached to the plunger 99. However, this upward movement of the plunger rod, ejectors and levers acts in opposition to the spring 110 acting against the collar 109. This action of the spring causes the cam surface 112 of the collar 109 to ride on the cam surfaces of the arms 103 of the levers 102, thus causing them to spread apart. Consequently, just as the piece 120 is ejected from the die 83, the force of the spring 110 is sufficient to cause the arms 103 to spread apart. As the arms 103 are spread apart, the arms 104 are brought into the recesses 106 against the action of the spring 108 and the plunger 99 and associated parts dropped back through the aperture 114 in the plate 113, thereby permitting the ejectors 89 to recede before the finish of the upstroke of the ram.

The strip 116 can then be again fed to the die 41 and shaped upon a subsequent downstroke of the ram, which downstroke also causes the plate 113 to again pick up the end of the levers 102 and reoperate the ejecting mechanism.

Figures 11, 12 and 13 illustrate the use of a retainer lock formed according to the method and by the apparatus of this invention. In Figure 11, a valve 125 is shown comprising the usual head 126 and stem 127. The stem 127 is formed with a pair of annular grooves adjacent the tip end thereof. The collar 129 comprises a pair of the formed mating pieces 120 having annular ridges 118 therein which ridges fit in the grooves 128. When the collar 129 is fitted onto the end of the valve, it presents an outer frusto conical surface upon which a plate 130 having a corresponding frusto conical aperture 131 therethrough may be fitted. The plate 130 serves as a spring retainer for the usual valve seating spring 132.

It has been found that, by the use of the apparatus of our invention, spring retainer locks of the highest grade can be made sufficiently economically to warrant their use in moderate priced autmobile installations.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. Apparatus for forming spring retainer locks, comprising cooperating composite die blocks, means for guiding a metal strip therebetween, means at the finishing end of said die blocks constituting an abutment for the end of said strip to determine the position thereof in said die blocks, one of said die blocks having successive smooth face portions offset from each other to act upon successive portions of said strip, the other of said die blocks having corresponding coacting face portions provided with recurrent sets of contours and means resiliently supporting alternate of said face portions to effect transverse shearing and stripping action.

2. Apparatus for forming spring retainer locks, comprising a pair of plates adapted to be actuated by a punch press, a pair of opposed die blocks attached to the respective plates, each of said die blocks having a set of dies cooperating with the dies in the other block for embossing, shearing and shaping a portion of a metal strip to form a spring retainer lock and ejecting means operatively associated with one of said plates for removing the formed lock to permit the continuous forming of the locks from a single strip of metal.

3. Apparatus for forming spring retainer locks, comprising upper and lower die blocks adapted to be actuated by a punch press, each of said blocks having a set of dies adapted to cooperate with the dies of the other block, the set of dies in the upper block including a die having a semi-frusto conical recessed face, the set of dies in the lower block including a die having a semi-cylindrical convex face for cooperation with the recessed face die to ultimately form the lock and ejector means extending thru said lower die for removing the finished locks from the apparatus.

4. Apparatus of the type described, comprising a pair of plates adapted to be actuated by a punch press, a pair of opposed die blocks attached to said plates, a set of dies in each of said blocks adapted to cooperate with the dies in the opposite block to emboss, trim, form and shear a portion of a strip of metal to form a spring retainer collar, and ejecting means operated by one of said plates to remove the formed piece to thereby permit of continuous operation.

5. Apparatus for forming spring retainer locks, comprising cooperating composite die blocks, a guide piece attached to one of said blocks for guiding a strip of metal therebetween, an abutment at the end of said block against which the end of said strip is placed to determine the position thereof in said die blocks, one of said die blocks having successive smooth faced portions offset from each other to act upon successive portions of said strip, the other of said die blocks having corresponding coacting face portions provided with recurrent sets of grooves, one of said blocks having a die with a semi-frusto conical recessed face cooperating with a die in the other block having a convex semi-cylindrical face, means resiliently supporting alternate face portions to effect shearing and stripping action and means operatively associated with one of said blocks for ejecting the formed strip.

6. Apparatus for forming spring retainer locks, comprising cooperating composite die blocks, means for guiding a strip of metal therebetween, means at the finishing end of said die blocks constituting an abutment for the end of said strip to determine the position thereof in said die blocks, one of said die blocks having successive smooth faced portions offset from each other to act upon successive portions of said strip, the other of said die blocks having corresponding coacting face portions provided with recurrent sets of grooves, one of said blocks having a die with a semi-frusto conical recessed face cooperating with a die in the other block having a convex semi-cylindrical face, and means resiliently supporting alternate face portions to effect transverse shearing and stripping action.

7. Apparatus for forming spring retainer locks, comprising a pair of plates adapted to be actuated by a punch press, a pair of opposed die blocks attached to the respective plates, each of said die blocks having a set of dies opposing the dies in the opposite block, certain of said dies being provided with offset faces and certain other dies cooperating therewith being provided with resiliently mounted faces so as to guide a strip of metal between the dies to permit successive operations on a portion of the strip and ejecting means operatively associated with one of said plates for removing the formed lock to allow continuous forming of the locks from a single strip of metal.

8. In an apparatus for forming spring retainer locks, a die block having a longitudinal groove therein removable walls defining the ends of said groove, a set of dies in said grooves held in place by spacers between the dies and the end walls, one of said dies having an offset face each portion of which is provided with a pair of grooves and resiliently mounted dies on each side of said first die.

9. In an apparatus for forming spring retainer locks, a die block having a longitudinal recess therein, removable walls defining the ends of said groove, spacers adjacent said end walls, dies held in place in the middle portion of said groove by said spacers, a guiding piece for a metal strip mounted on one of said end walls, a spring actuated guide lever in one of said spacers adjacent said guiding piece, one of said dies having an offset face each portion of which is provided with a pair of grooves and resiliently mounted dies on each side of said first die.

10. In an apparatus for forming spring retainer locks, a die block having a longitudinal recess therein, removable walls at the ends of said grooves, a set of dies in said groove held in place by spacers between said dies and said end walls, one of said dies having a plane face, another of said dies having a recessed semi-frusto conical face and a third die between said first and second dies having a resiliently mounted stamping face.

11. Apparatus for forming spring retainer locks, comprising a pair of plates adapted to be actuated by a punch press, opposed upper and lower die blocks mounted on said plates, dies in said blocks adapted to cooperate to shear, emboss and form successive portions of a metal strip into spring retainer locks, ejecting means passing thru one of said dies for removing the formed portion of said strip, said ejecting means being operated by a third plate operatively connected to one of said other plates, said ejecting means having a pair of arms pivoted thereto at their midportions, said arms normally contacting said third plate so that the ejectors are raised therewith, a collar on said ejecting means actuated by a spring and contacting the upper portions of said arms to spread them outwardly as the third plate approaches the end of its upward path to thereby cause the lower ends of the arms to move toward the ejecting means to cause the ejecting means to drop back thru an aperture in said third plate to permit a portion of the strip to be passed over said die.

12. The method of forming valve spring retainer locks which comprises simultaneously acting on successive portions of a metal strip to spread and emboss a portion, to trim and partially form the already spread and embossed next adjacent portion, and to completely shape and shear transversely the already trimmed, partially formed next adjacent portion and advancing said strip a step at a time to repeat said enumerated steps.

13. The method of forming valve spring retainer locks having non-parallel sides, which comprises successively, transversely defining a portion of a strip of metal, trimming the edges of the portion to trapezoidal shape, embossing the underside of the strip to form transverse beads thereon, shaping said portion between coacting semi-frusto conical and semi-cylindrical surfaces and shearing said formed portion from the rest of the strip.

DANIEL KELLEHER.
EUGENE A. McBRIDE.